(12) United States Patent
Jainek et al.

(10) Patent No.: US 8,480,892 B2
(45) Date of Patent: Jul. 9, 2013

(54) OIL FILTER, OIL SEPARATOR AND FILTER INSERT THEREOF

(75) Inventors: Herbert Jainek, Heilbronn (DE);
Johannes Lampert, Wörthsee (DE);
André Rösgen, Remshalden (DE); Eric Gillenberg, Speyer (DE); Jens Hähn, Heidelberg (DE); Jens Gutekunst, Gondelsheim (DE); Marco Schilling, Speyer (DE); Dietmar Klein, Germersheim (DE)

(73) Assignee: Mann + Hummel GmbH, Ludwigsburg (DE)

( * ) Notice: Subject to any disclaimer, the term of this patent is extended or adjusted under 35 U.S.C. 154(b) by 759 days.

(21) Appl. No.: 12/515,546

(22) PCT Filed: Dec. 4, 2007

(86) PCT No.: PCT/EP2007/063206
§ 371 (c)(1),
(2), (4) Date: Aug. 28, 2009

(87) PCT Pub. No.: WO2008/068237
PCT Pub. Date: Jun. 12, 2008

(65) Prior Publication Data
US 2010/0032359 A1 Feb. 11, 2010

(30) Foreign Application Priority Data
Dec. 4, 2006 (DE) .................... 20 2006 018 334 U

(51) Int. Cl.
*B01D 27/00* (2006.01)
*B01D 27/08* (2006.01)
*B01D 35/30* (2006.01)

(52) U.S. Cl.
USPC ............ 210/232; 210/443; 210/445; 210/450

(58) Field of Classification Search
USPC .................................. 210/232, 443, 445, 450
See application file for complete search history.

(56) References Cited

U.S. PATENT DOCUMENTS

| 4,721,563 A | 1/1988 | Rosaen |
| 5,685,985 A | 11/1997 | Brown |

(Continued)

FOREIGN PATENT DOCUMENTS

| DE | 4127031 A1 * | 2/1993 |
| DE | 20011003 U1 | 11/2001 |
| EP | 844012 A2 * | 5/1998 |
| EP | 1306117 A | 5/2003 |

OTHER PUBLICATIONS

Search report of international application PCT/EP2007/063206.

*Primary Examiner* — Thomas M Lithgow
(74) *Attorney, Agent, or Firm* — James Hasselbeck

(57) ABSTRACT

The invention concerns a filter insert (1) that is provided as an exchangeable insert in an oil filter of an internal combustion engine, as well as a corresponding oil filter. The oil filter comprises a filter housing (3) separable along a separating plane (2) and the exchangeable filter insert (1). Two housing parts (4, 5) of the filter housing (3) are sealed relative one another along the separating plane (2) by means of a seal (6). The seal (6) is captively secured on the filter insert (1).

6 Claims, 3 Drawing Sheets

U.S. PATENT DOCUMENTS

| | | |
|---|---|---|
| 6,308,836 B1 | 10/2001 | Guichaqua |
| 2003/0146149 A1 | 8/2003 | Binder et al. |
| 2003/0226800 A1 * | 12/2003 | Brown et al. ............ 210/497.01 |
| 2007/0181481 A1 * | 8/2007 | Reynolds et al. ............. 210/304 |

* cited by examiner

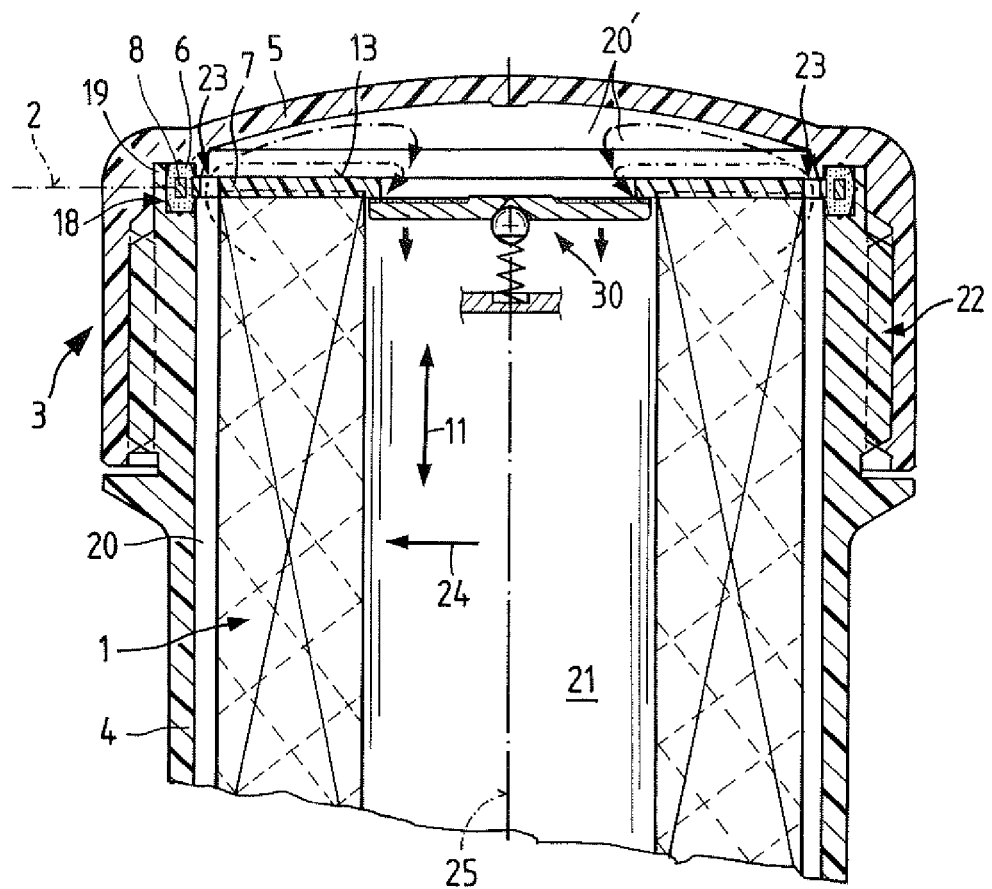
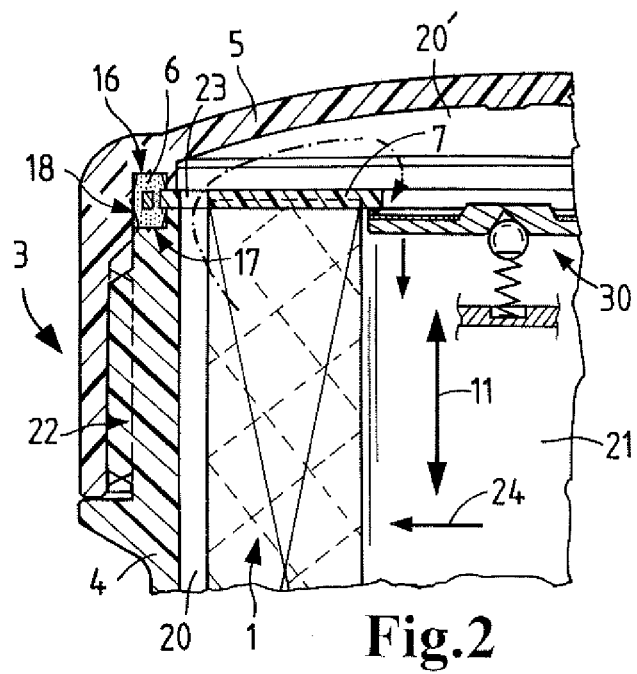

OIL FILTER, OIL SEPARATOR AND FILTER INSERT THEREOF

CROSS REFERENCE TO RELATED APPLICATIONS

This application is US National Stage Entry of international patent application no. PCT/EP2007/063206, filed Dec. 4, 2007 designating the United States of America, the entire disclosure of which is incorporated herein by reference. Priority is claimed based on Federal Republic of Germany patent application no. 202006018334.5, filed Dec. 4, 2006, the entire disclosure of which is incorporated herein by reference.

TECHNICAL FIELD

The invention concerns a filter insert for an oil filter or oil separator as well as a corresponding oil filter or oil separator.

PRIOR ART

In motor vehicles and industrial motors oil filters are used in which the filter insert is configured separately from the filter housing. The oil filter has a filter housing that is divided along a separating plane wherein two housing parts of the filter housing are sealed relative to one another by means of a seal along a separating plane. One of the two housing parts is embodied as a lid part and is released for exchanging the filter insert. When exchanging the filter insert at the prescribed servicing intervals the seal of the two housing parts must also be exchanged.

In practice, it is observed that the exchange of the housing seal is neglected. It happens that the old seal after exchanging the filter insert is used again; this can cause leaks at the filter housing. Often, a wrong seal is employed or the seal is completely forgotten. As a result oil loss occurs. Consequential damage, in particular motor damage, is possible.

The possibilities of improper servicing in connection with the oil filters are further expanded in that wrong filter inserts are used or filter inserts that fit only unsatisfactorily or are insufficient with regard to quality requirements. They reduce the filtration result and can cause premature motor wear and even serious motor damage.

Oil separators for crankcase venting systems also exhibit the aforementioned disadvantages.

SUMMARY OF THE INVENTION

The invention has the object to provide a filter insert with improved handling for servicing work.

The invention moreover has the object to provide an oil filter or oil separator with improved operational safety.

An exchangeable filter insert for operation in an internal combustion engine as well as a corresponding oil filter or oil separator for the internal combustion engine are proposed in which the oil filter or oil separator comprises a filter housing that is separable along a separating plane as well as the corresponding exchangeable filter insert. Two housing parts of the filter housing are sealed relative to one another along the separating plane by means of a seal. The seal this attached captively on the filter insert.

According to the invention the housing seal and the filter insert are a structural unit that in the context of the prescribed servicing intervals is exchanged as a whole. By removing the old filter insert and mounting the new filter insert, a mandatory exchange of the seal also takes place as a result of the combination into a structural unit. In this way it is prevented that the latter is reused or is omitted during assembly. The structural unit of filter insert and seal must be matched system-inherently precisely to the contour of the filter housing. The insertion of filter inserts with deviating shape that possibly do not fulfill the operating requirements is therefore made difficult or even impossible. Instead, it is ensured that as a result of the geometric interaction of filter housing and seal only the precisely fitting prescribed filter insert can be mounted. The mix-up-proof exchange of the filter insert is simplified and the operational safety of the motor vehicle or its internal combustion engine is increased.

In an advantageous embodiment a circumferentially extending support disk is attached on the filter insert and the seal that is embodied in particular as a profiled seal extends peripherally on its outer rim. The support disk can fulfill several functions. For an appropriate shape of the oil filter it can act as a partition between the crude side and the clean side of the filter. In particular in case of an embodiment as a circumferentially extending preferably planar support disk that is substantially rigid at least in the radial direction it also serves as a support or pressure means. In case of axial compression of the seal, the seal widens in the radial direction and rests seal-tightly against the sealing surface of the housing. The support disk that is rigid in the radial direction provides a sealing radial pressing force for the seal on a corresponding sealing surface of the housing.

For this purpose, the separating plane is advantageously aligned at least approximately with an axial end face of the filter insert wherein the support disk with the seal is flow-tightly formed on and attached to the axial end face. This fluidic separation of crude side and clean side is ensured reliably by the support disk that is to be exchanged together with the filter insert. At the same time, the support disk positions the seal in the predetermined mounting position, i.e., in the separating plane between the two housing parts. Positioning of the seal of the filter insert as a whole is simplified during mounting and the mounted operating state is permanently ensured.

In a preferred embodiment the filter housing extends along an axial direction and is in particular approximately cylindrically embodied wherein the separating plane extends radially relative to the axial direction and wherein the circumferentially extending seal in the mounted state is clamped in the axial direction between the two housing parts. Mounting of the filter insert is done in the axial direction. Upon subsequent joining of the two housing parts of the filter housing also in the axial direction the circumferentially extending seal is clamped and generates reliably a sealing action of the two housing parts relative to one another. Depending on the configuration of the support disk and the position of the oil filter or oil separator as a whole, as an additional function also a sealing action of the crude side relative to the clean side can be produced as needed. In case of an oil separator the term crude side refers, of course, to the inlet area and the term clean slide to the outflow area of the oil separating system.

Additionally or alternatively it can be advantageous that the seal in the radial direction is seal-tightly pressed at least against one of the two housing parts. This radially pressed sealing function is enhanced and maintained in particular by the support disk that is substantially rigid in the radial direction.

Preferably, at least one of the two housing parts has a clamping ramp that acts in the plane of the separating plane on the seal. When axially tightening the two housing parts relative to one another the clamping ramp is moved relative to the seal so that the seal is compressed or deformed. High pressing forces result with a corresponding reliable permanent sealing action.

In a preferred embodiment the seal is metered on, deposited on or attached by injection molding. Preferably, the support disk has in the area of its outer rim penetrations that are penetrated by the injection-molded material of the seal. The structural unit of filter insert, seal and optionally support disk exhibits an intimate reliable connection of its individual components that remains non-releasable even under rough shop conditions.

Alternatively, it can also be expedient that the seal on the filter insert and in particular on the outer rim of the support disk is attached positive-lockingly. In particular, the seal is attached in a resilient fashion on the outer rim of the support disk, in particular on a thicker portion of the area of the outer rim.

In an expedient variant the seal is positive-lockingly secured in a groove on the outer rim of the support disk. Assembly can be realized with minimal apparatus expenditure in a simple way, optionally also in automated fashion. The seal is reliably and captively secured on the filter insert.

Preferably, the seal has a mounting ramp. When threading the filter insert into the filter housing the positioning of the seal relative to the filter housing is simplified. In particular, damaging the seal by imprecise positioning is prevented.

BRIEF DESCRIPTION OF THE DRAWINGS

Embodiments of the invention will be explained in the following with the aid of drawing in more detail. It is shown in:

FIG. 1 in a longitudinal section an oil filter or oil separator embodied in accordance with the invention showing the area of the separating plane of its two housing parts with inserted filter insert supporting a captively attached seal wherein the seal in the radial direction is supported against an edge of the lower housing part;

FIG. 2 a variant of the arrangement according to FIG. 1 wherein the seal is supported in the radial direction on the lid part of the filter housing;

EMBODIMENT(S) OF THE INVENTION

Figure 3:
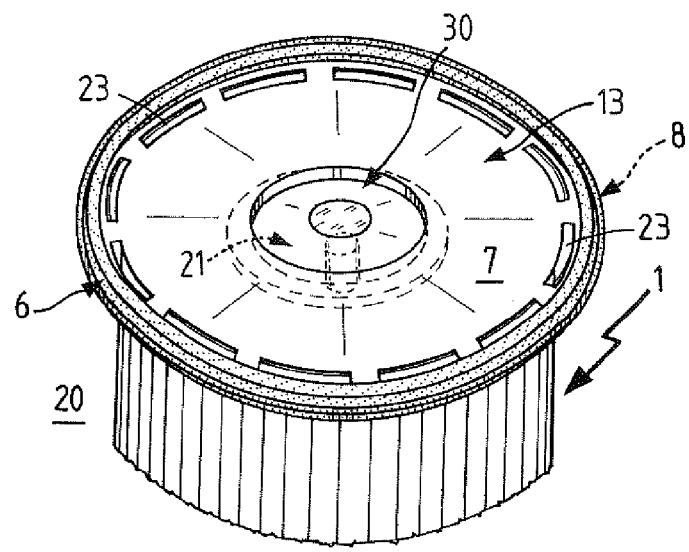
FIG. 3 a perspective illustration of a further embodiment of the filter insert with fluidically perforated support disk.

FIG. 1 shows in longitudinal section illustration a detail of an oil filter or oil separator of a motor vehicle, in particular a truck. An oil filter or oil separator of an industrial motor can also be provided. An oil filter can be arranged in the main flow or the bypass flow of the oil circulation of the internal combustion engine.

The oil filter or oil separator comprises a filter housing 3 with two housing parts 4, 5. The housing part 4 is connected fixedly to the motor, not illustrated. The additional housing part 5 is embodied as a removable lid and is screwed on by means of a circumferentially extending thread 22 to the housing part 4 secured to the motor.

The filter insert 1 or a coalescence insert is part of the oil filter or oil separator and is exchangeably secured in the filter housing 3. The filter insert 1 is arranged coaxially to the filter housing 3 with a common central axis 25 that extends in the axial direction 11. The filter housing 3 and the filter insert 1 are substantially of rotational symmetry relative to the central axis 25 and, in this connection, are approximately cylindrical. The filter housing 3 surrounds the exterior side of the filter insert 1 in the mounted state in a flow-tight and oil-tight way.

Between a circumferential wall of the housing part 4 and the exterior side of the filter insert 1 there remains a circumferentially extending annular chamber that forms the crude side 20 of the filter insert 1. Coaxially thereto on the inner side of the filter insert 1 a central cavity is provided by means of which a clean side 21 of the filter insert 1 is formed. In operation oil is flowing through the filter insert 1 in a radial direction opposite to arrow 24 and perpendicular to the axial direction 11 from the exterior to the interior, i.e., from the crude side 22 to the clean side 21. Supply of crude, unfiltered oil to the crude side 20 and removal of the filtered oil from the clean side 21 are not illustrated in order not to crowd the drawing.

The filter housing 3 is separable along a separating plane 2 shown in dashed lines in that the upper housing part 5 is removable from the housing part 4 connected to the motor or unscrewed by means of thread 22. In the illustrated mounted state the two housing parts 4, 5 of the filter housing 3 are sealed relative to one another along the separating plane 2 by means of a circumferentially extending seal 6. The circumferentially extending seal 6 is captively secured on the filter insert 1. For this purpose, the filter insert 1 supports a circumferentially extending support disk 7 and the seal 6 embodied as a profiled seal extends circumferentially at its outer rim 8.

After detaching the housing part 5 embodied as a lid part from the housing part 4 the filter insert 1 can be removed in the axial direction 11 from the housing part 4 and can be replaced by a new filter insert 1 of the same type. As a result of captive attachment of the seal 6 on the filter insert 1 this seal is mandatorily exchanged.

The separating plane 2 between the two housing parts 4, 5 is aligned with the axial end face 13 of the filter insert 1. The support disk 7 is embodied together with the seal 6 in the axial direction 11 so as to be flow-tight and attached in a flow-tight way to the end face 13. In this way, not only the two housing parts 4, 5 are sealed-tightly connected relative to one another and the exterior side of the filter housing 3. Moreover, this arrangement also produces a sealing action of the crude side 20 relative to the clean side 21.

Alternatively, as schematically indicated in FIG. 1, a bypass valve can be arranged in the upper clean liquid area. In this case, the support disk 7 has penetrations as illustrated in FIG. 3. Above the support disk 7 there is the crude side 20' for enabling flow of the crude liquid through bypass valve to the clean side. This concerns in particular operating states such as increased contamination of the filter insert.

FIG. 2 shows in a detail illustration a variant of the arrangement according to FIG. 1 in which at the lower housing part 4 attached to the motor an axial clamping surface 17 is formed. On the housing part 5 embodied as a lid part an axial clamping surface 16 acting in the axial direction is provided as well as a circumferentially extending radial clamping surface 18. In the illustrated mounted state the circumferentially extending seal 6 is clamped in the axial direction 11 between the two housing parts 4, 5 in such a way that the two axial clamping surfaces 16, 17 in the axial direction 11 rest seal-tightly on the elastic seal 6. The camping action of the seal 6 between the axial clamping surfaces 16, 17 produces also a radial expansion of the seal 6. This has the result that the seal 6 in the radial direction 24 is seal-tightly pressed against the radial clamping surface 18. For maintaining the radial pressing force the circumferentially extending support disk 7 is planar and substantially rigid at least in the radial direction 24.

The arrangement according to FIG. 1 differs from that of FIG. 2 in that the radial clamping surface 18 is not arranged at the upper housing part 5 (FIG. 2) but on the lower housing part 4 attached to the motor. For this purpose, the lower housing part 4 is provided with a circumferentially extending rim 19 whose radial inner side forms the radial clamping surface 18. In regard to other features and reference numerals the arrangements according to FIGS. 1 and 2 are the same.

The perspective illustration according to FIG. 3 shows a variant of the filter insert 1 according to FIGS. 1 and 2. The seal 6 embodied as a profiled seal extends about the outer rim 8 of the support disk 7 that is attached to the end face of the filter insert 1. On the inner side of the seal 6 but on the exterior side of the filter body of the filter insert 1 the support disk 7 attached to the end face 13 is provided with a plurality of openings 23 distributed about the circumference which openings in the mounted state (FIG. 1) are in axial overlap with the crude side 20. In certain configurations of the oil filter, for example, in connection with a bypass or pressure relief valve 30, a flow connection from the crude side 20 to the clean side 21 can be produced in this way. With regard to other features and reference numerals, the filter insert 1 according to FIG. 3 is the same as those according to FIGS. 1 and 2.

Figure 4:
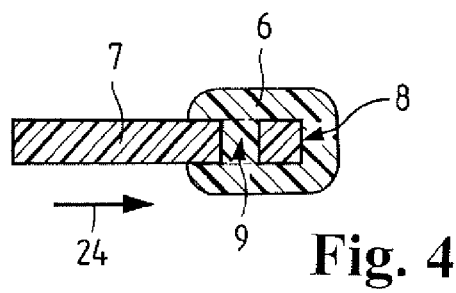
FIG. 4 a schematic cross-sectional illustration of the support disk in the outer rim area with injection-molded seal.
Figure 5:
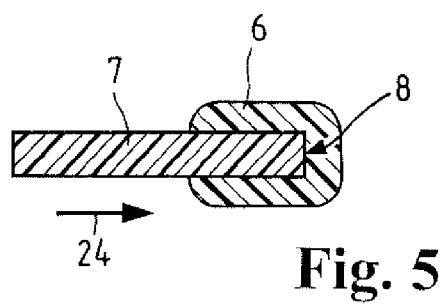
FIG. 5 a schematic cross-sectional illustration of a further involvement with positive-lockingly attached seal.
Figure 6:
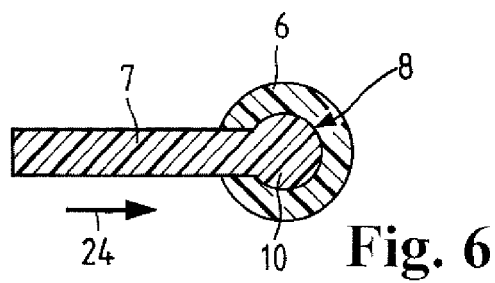
FIG. 6 a variant of the arrangement according to FIG. 5 with a thicker portion arranged in the rim area that secures the seal positive-lockingly.

In FIGS. 4 through 6 different schematic cross-sectional illustrations of the rim area of the support disk 7 are illustrated. The seal 6 that is illustrated in cross-section as a profiled seal engages, relative to the radial direction 24, the exterior side the outer rim 8 of the support disk 7.

In the embodiment according to FIG. 4 the seal 6 is attached by injection molding on the outer rim 8 of the support disk 7. The material of the seal 6 can also be metered on by a suitable device or applied in other ways. In this way, an intimate material bonding between the rubber-elastic material of the seal 6 and the deviating material of the support disk 7 that in comparison is more rigid is achieved. In combination therewith, a positive-locking connection by the U-shaped cross-section of the seal 6 is provided. As a further enhancement the support disk 7 in the area of its outer rim 8 has a number of penetrations 9 through which the injection-molded material of the seal 6 penetrates.

In the alternative embodiments according to FIGS. 5 and 6 the seal 6 is linked in a resilient fashion to the outer rim of the support disk 7 by positive-locking engagement. The positive-locking engagement is produced by a U-shaped cross-section of the profiled seal 6 that is radially inwardly open and that engages the outer circumferentially extending rim 8 of the support disk 7. Since the seal 6 also extends as a closed ring, the seal is secured positive-lockingly and captively on the support disk 7. By utilizing the elastic deformability of the seal 6 it can be produced as an individual part and can be pulled on or mounted on the rim 8. For enhancing the positive-locking action, the cross-section of the support disk 7 in the area of the outer rim 8 is embodied as a circumferentially extending thicker portion 10 (FIG. 6) that is enclosed on all sides by the profiled seal 6.

Figure 7:
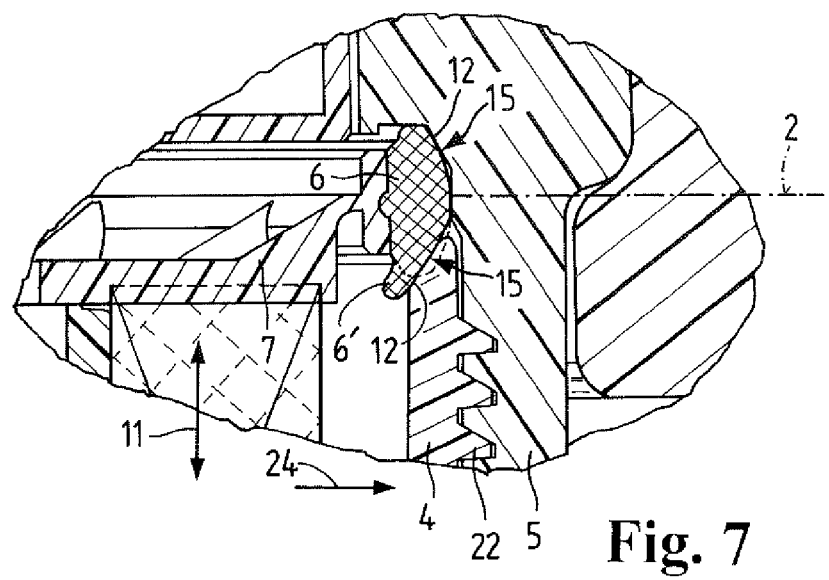
FIG. 7 an enlarged detail illustration of a further embodiment with a seal that is squeezed by means of a clamping ramp.

FIG. 7 shows in an enlarged detail view a further embodiment of the invention according to which the seal 6 in its cross-section has radially outwardly and, relative to the axial direction 11, on both sides a circumferentially extending mounting ramp 15. The two mounting ramps 15 facilitate threading of the seal 6 into its predetermined seat. Upon screw-connecting the two housing parts 4, 5 by means of the thread 22, two clamping ramps 12, slanted relative to the axial direction 11 or the clamping direction, are clamped in the axial direction relative to one another. The two clamping ramps 12 are resting against the mounting ramps 15. As a result of the axial clamping movement and their slanted shape they produce a clamping force that acts on the seal 6 opposite to the radial direction 24 so that the cross-section of the seal 6 is deformed to a shape referenced by reference numeral 6' and rests resiliently against the correlated clamping ramp 12. The clamping ramps 12 act thus counter to the radial direction 24, i.e., in a direction parallel to the separating plane 2, on the seal 6.

Figure 8:
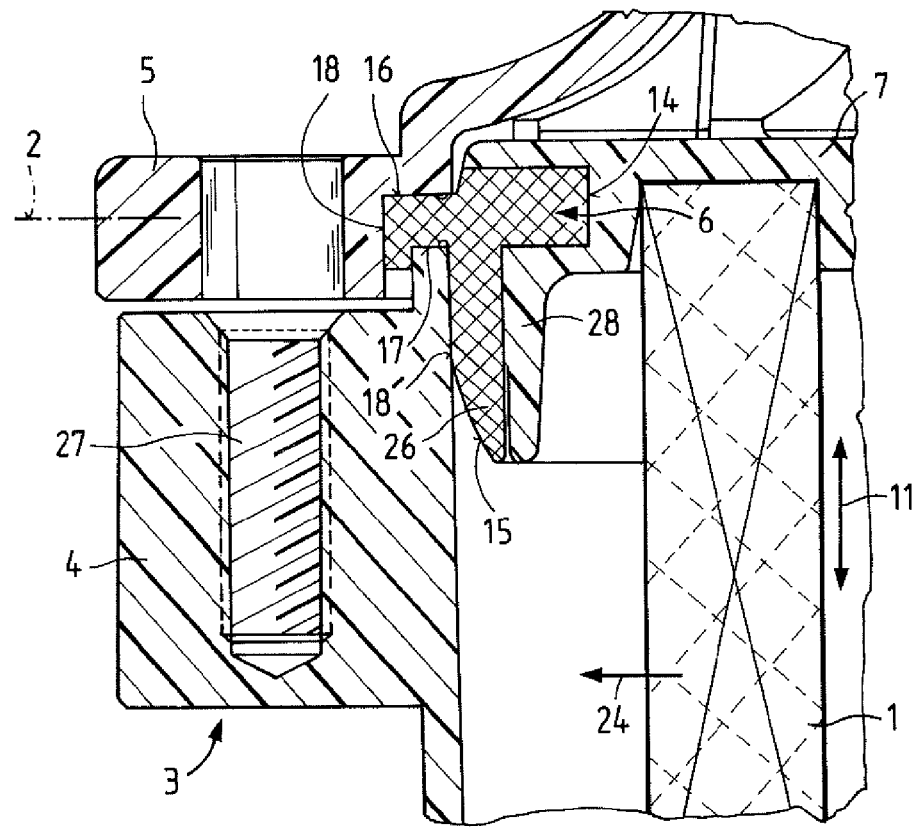
FIG. 8 an embodiment of the invention with a seal that is positive-lockingly secured in a circumferentially extending groove and has a mounting ramp.

FIG. 8 shows in a cross-sectional detail view a further embodiment of the invention as an enlarged detail view in the area of the separating plane 2 between the two housing parts 4, 5 of the filter housing 3. As an alternative to the screw connection of the housing parts 4, 5 by means of thread 22 (FIGS. 1, 2, 7), a screw connection of two housing parts 4, 5 by screw holes 27 is provided into which non-illustrated connecting screws are inserted. The circumferentially extending seal 6 is positive-lockingly secured in a circumferentially extending groove 14 of the support disk 7 that is outwardly open in the radial direction 24. A section of the seal 6 projecting in the radial direction 24 is clamped between an axial clamping surface 16 of the housing part 5 and an axial clamping surface 17 of the housing part 4 and is moreover seal-tightly pressed in the radial direction 24 against a radial clamping surface 18 of the housing part 5. In addition, the support disk 7 is provided with a circumferentially extending collar 28 oriented toward the housing part 4 attached to the motor; the collar is positioned radially on the inner side of a cylindrically extending lip 26 of the seal 6. The circumferentially extending lip 26 is provided in the area of its free edge with a mounting ramp 15. Relative to the axial direction 11 a central section of the lip 26 positioned between the mounting ramp 15 and the groove 14 rests radially externally on a radial clamping surface 18' of the housing part 4. For generating the corresponding pressing force, the radially inwardly positioned collar 28, integrally formed of the comparatively stiff material of the support disk 7, is provided that prevents deformation of the lip 26 radially inwardly.

With regard to other features and reference numerals, the arrangements according to FIGS. 7 and 8 are the same relative to one another as well as relative to the embodiments according to FIGS. 1 through 6.

The invention claimed is:

1. An exchangeable filter insert for an oil filter or oil separator, comprising:
a filter body (1) having a hollow interior (21), said filter body radially separating a crude side (20) from a clean side (21);
a circumferentially extending, planar support disk (7) secured to an axial end face (13) of the filter body (1);
a profiled seal (6) extending circumferentially around and on an outer rim (8) of the support disk (7), the seal (6) captively secured on the support disk (7);
wherein the seal (6) extends radially outwardly from the planar support disk (7) and radially beyond the filter body;
wherein the seal (6) is captively secured and molded onto the radial outer rim (8) of the planar support disk (7);

wherein the seal (6) is U-shaped, extending over the outer rim (8) and onto axially opposing sides of the support disk (7);

wherein the support disk (7) has plurality of openings (23) extending axially through the support disk (7) and arranged radially outwards beyond the radial outside of the filter body (1), the openings (23) permitting flow through the support disk (7) from the crude side (20) to the clean side (21);

wherein the support disk (7) in the area of its outer rim (8) has penetrations (9) which are penetrated by the molded material of the seal (6);

wherein the support disk (7) has a bypass opening in communication with the hollow interior (21), the support disk (7) at the axial side facing the hollow interior, the bypass opening forming a valve seat configured to be closed on the hollow interior side by a bypass valve (30).

2. Filter insert according to claim 1, characterized in that the circumferentially extending, in particular planar, support disk (7) is substantially rigid at least in radial direction (24).

3. Filter insert according to claim 1, characterized in that the seal (6) is positive-lockingly attached on the filter insert (1) and in particular on the outer rim (8) of the support disk (7).

4. Oil filter or oil separator of a motor vehicle, comprising:
a filter housing (3) separable along a separating plane (2), the filter housing including
a first housing part (4); and
a second housing part (5); and
an exchangeable filter insert (1) according to claim 1 exchangeably installed into an interior of the filter housing (3),
wherein the two housing parts (4, 5) of the filter housing (3) along the separating plane (2) are sealed relative to one another by the seal (6).

5. Oil filter or oil separator according to claim 4,
wherein the filter housing (3) extends along an axial direction (11) and is embodied approximately cylindrically,
wherein the separating plane (2) extends radially to the axial direction (11), and
wherein the circumferentially extending seal (6) in the mounted state is clamped in the axial direction (11) between the two housing parts (4, 5).

6. Oil filter or oil separator according to claim 4, characterized in that the seal (6) is seal-tightly pressed in the radial direction (24) against at least one of the two housing parts (4, 5).

\* \* \* \* \*